Patented Oct. 2, 1934

1,975,169

UNITED STATES PATENT OFFICE 1,975,169

CONCENTRATING THE WATER - SOLUBLE VITAMINE CONTENT OF A WATER-SOLUBLE VITAMINE CONTAINING MATERIAL

Axel Birger Octavus Norrbin, Strangnas, Sweden

No Drawing. Application November 14, 1928, Serial No. 319,444. Renewed September 16, 1932

3 Claims. (Cl. 167—81)

The object of my invention is the concentration of the vitamine content of a vitamine containing material in such a way that the concentrated vitamine product preserves its curative effect.

I have found that the vitamine content of a vitamine-containing material after being extracted from the bulk of this material by a dilute acid can be separated from the solution obtained by the extraction in a highly concentrated state by dissolving in the solution an organic substance, which can be settled out as a voluminous precipitate by neutralization of the solution. By precipitating this organic substance the voluminous precipitate carries down with it almost all the vitamines. I also have found that it is suitable to choose such an organic substance which is easily soluble in acid solution and which is capable of being precipitated in a neutralized solution by an inorganic base, which afterwards can be separated from the organic substance by an inorganic acid, which together with the inorganic base constitutes an insoluble salt. By stirring the organic substance precipitated by the inorganic base with water, alcohol or the like and adding the above mentioned inorganic acid, this acid constitutes with the inorganic base an insoluble salt, which is settled down, and the easy soluble organic substance and the vitamines remain in the solution. It is of importance that the organic substance is settled out in a neutralized solution or in a solution of slight acidity or alkalinity, because the vitamins will be destroyed in a solution of higher alkalinity. The organic precipitate must be voluminous as above mentioned, in order to be capable to carry down with it the vitamin content. The inorganic salt which is obtained by adding the inorganic acid to the organic substance precipitated together with the inorganic base must be in a granular or crystalline state. After the inorganic salt has been separated from the solution, this solution may be concentrated, whereby an emulsion is obtained. The emulsified matter contains almost all vitamines and can be easily separated from the solution for instance by centrifuging the emulsion.

The most suitable organic substances for the process I have found to be sugars, such as saccharose, dextrose, levulose and the like, which can be precipitated in a neutralized solution as sugar-calcium by adding calcium carbonate or calcium hydroxide. As inorganic acid for separating the calciumoxide from the sugar-calcium I use sulfuric acid. Thus I add to the stirred up sugar-calcium in water or alcohol or in a mixture of water and alcohol so much sulfuric acid, that all calcium-oxide is precipitated as gypsum. Hereby it is favourable to add the sulfuric acid very cautiously as long as no free acid may appear by Congopaper.

*Example.*—In the brewery is obtained yeast preserved by standing under pure water. The water is decanted from the yeast and the bulk is stirred with acetic acid diluted to about 10 per cent and at this strength an amount equal to about two or three times the volume of the yeast treated is sufficient. The mixture is placed in a closed vessel and is allowed to stand for some months. Then the clear brown coloured liquid is decanted or siphoned or centrifugated from the bulk. To the liquid is added calcium carbonate about 20 gr. to 51 liters of liquid.

When the calcium carbonate has been dissolved about the same weight sugar (saccharose, dextrose or levulose) is added. After the sugar is dissolved, the sugar-calcium is settled out by neutralizing the solution with an alkali. (NaOH-solution or KOH-solution or a mixture of both), whereby the precipitate carries down with it almost all the vitamins in the solution. Instead of neutralizing only with an alkali it is favourable to add a CaOH-solution until the solution is nearly neutralized and then cautiously neutralize with a dilute solution of NaOH or KOH. The more this alkali is diluted, when the neutralizing point is reached, the better result is obtained. I therefore use an alkali diluted to about 1 to ½ per cent by weight. The precipitate is obtained already when the solution is of slight acidity, but it is most suitable to add alkali to neutralization or until the solution shows slight alkalinity (Litmus). The solution is now allowed to stand until the precipitate is settled out and the clear solution is separated from the precipitate by decanting and the precipitate collected on a filter. The precipitate may be washed with water, but usually this is not necessary. Then the precipitate is placed in a vessel of porcelain or the like and stirred with pure water, and during continual stirring sulfuric acid diluted to 5-10 per cent per weight is cautiously added as long as no free sulfuric acid becomes visible by Congopaper. Now ethyl alcohol is added until the solution contains about 50 per cent alcohol by volume. The mixture is allowed to stand in a closed vessel. Afterwards the clear yellow solution is decanted from the precipitate. The alcohol is distilled off. Then the solution is neutralized with alkali and the resultant precipitate is separated from the solution by decanting or filtrating. The thus obtained solution is concentrated in vacuo, whereby an emulsion is obtained. By scrutinizing this emulsion in the microscope elastic drops appear. The substance sought for may be extracted by centrifuging or by letting the drops deposit on the walls of the vessel, in which the solution is concentrated. The substance is obtained as a semisolid grey or light yellow mass, which easily can be dissolved in pure water or dilute alcohol as a clear solution. It gives biuret reactions and rose colour treated with boiling Millons reagent. A few milligrammes of this mass, injected in the breast-muscle of a bird, cure cramps and paralysis due to acute beriberi. If the solution is made acid, a precipitate is obtained, which contains organic bound phosphoric acid.

Having described my invention, what I claim as new and wish to secure by Letters Patent is:

1. A method of concentrating the vitamine content in yeast from the brewery, which comprises extracting the yeast with acetic acid diluted to about 10 per cent and in the solution thus obtained dissolving a calcium compound and sugar, neutralizing the solution thus obtained whereby a calcium salt of sugar is precipitated and separating the matter carried down with the settled out sugar salt from said salt.

2. A method of concentrating the vitamine content in yeast from the brewery, which comprises extracting the yeast with acetic acid diluted to about 10 per cent and in the solution thus obtained dissolving a calcium compound and sugar, neutralize the solution thus obtained with an alkali, separating the precipitate from the solution, stirring the precipitate with water, adding dilute sulfuric acid until almost all calcium is precipitated as gypsum, adding ethyl alcohol to about 50 per cent by volume, separating the solution from the precipitate, distilling off the alcohol, neutralizing with alkali and concentrating the solution in vacuo to an emulsion and separating the emulsified matter from the solution.

3. The method of concentrating the water-soluble vitamine of a material containing such vitamine, which comprises extracting the vitamine from the material with a dilute acid, dissolving sugar in said acid solution, adding to said solution a calcium base capable of forming with said sugar in a non-acid solution, insoluble calcium-sugar, adding alkali to precipitate said calcium-sugar, isolating the calcium sugar, adding a sulphate compound to said isolated calcium sugar whereby to form insoluble calcium sulphate, removing the calcium sulphate, and recovering the vitamine from the residue.

AXEL BIRGER OCTAVUS NORRBIN.